US008239292B2

(12) United States Patent
Drazan et al.

(10) Patent No.: US 8,239,292 B2
(45) Date of Patent: Aug. 7, 2012

(54) METHOD AND APPARATUS FOR DEALER CONNECTIVITY

(75) Inventors: Michael D. Drazan, Wayzata, MN (US); Michael P. Lissick, Inver Grove Heights, MN (US); Gary D. Podraza, Lakeville, MN (US); Richard W. Weigel, Edina, MN (US)

(73) Assignee: The Toro Company, Minneapolis, MN (US)

( * ) Notice: Subject to any disclaimer, the term of this patent is extended or adjusted under 35 U.S.C. 154(b) by 34 days.

(21) Appl. No.: 11/827,191

(22) Filed: Jul. 11, 2007

(65) Prior Publication Data
US 2009/0018933 A1 Jan. 15, 2009

(51) Int. Cl.
*G06Q 10/00* (2012.01)
(52) U.S. Cl. ............................................ 705/28; 705/26
(58) Field of Classification Search ................. 705/7, 10, 705/28, 37, 26, 27, 1, 16; 707/10, 100, 101, 707/102; 709/203, 223, 225
See application file for complete search history.

(56) References Cited

U.S. PATENT DOCUMENTS
| | | | |
|---|---|---|---|
| 6,240,186 B1 | 5/2001 | Hyde et al. | |
| 6,418,416 B1 * | 7/2002 | Rosenberg et al. | 705/28 |
| 6,954,736 B2 * | 10/2005 | Menninger et al. | 705/28 |
| 7,080,092 B2 | 7/2006 | Upton | |
| 2002/0178170 A1 | 11/2002 | Britton et al. | |
| 2005/0278052 A1 * | 12/2005 | Bett et al. | 700/108 |
| 2006/0069598 A1 * | 3/2006 | Schweitzer et al. | 705/8 |

FOREIGN PATENT DOCUMENTS
EP 770967 A2 * 5/1997

OTHER PUBLICATIONS

"InfoNow Makes Channel Intelligence Available on Demand; Software-as-a-service reporting tool AnalyticInsight delivers increased visibility into channel sales performance; enables more informed, strategic decision-makinG". PR Newswire May 30, 2007 Business Dateline, ProQuest. Web. Oct. 15, 2011.*

* cited by examiner

*Primary Examiner* — Matthew Gart
*Assistant Examiner* — Rokib Masud
(74) *Attorney, Agent, or Firm* — Merchant & Gould P.C.

(57) ABSTRACT

An adaptable application is installed throughout a distribution network for directly accessing a variety of different databases utilized by different business systems. The direct access application periodically queries the database with which it is associated. In response to the query, sales and inventory data is read from the dealer business computer system by a data access services module. The information retrieved from the query is placed in a transmission queue. A data mapping module transforms the data into the manufacturer's standard transaction format, and presents the transformed data to a communications module. The information is then transmitted to the manufacturer or other upstream distribution channel entity. The information forwarded from each of the dealers is accumulated at the manufacturer's location. Various reports can be run which are useful to the efficient running of the distribution channel.

14 Claims, 8 Drawing Sheets

Run Date: 02/28/2007  Page 1

Dealer Sales Detail by Product Report

Product Group: AB03

| Dealer # | Model # | List Price | MTD Qty | YTD Qty | | MTD $ | YTD $ |
|---|---|---|---|---|---|---|---|
| 2005 | 100788 | $333 | 13 | 17 | | 4,329 | 5,661 |
| | 100504 | $1,999 | 1 | 1 | | 1,999 | 1,999 |
| | 100896 | $1,801 | 3 | 6 | | 5,403 | 10,806 |
| | 100419 | $560 | 12 | 18 | | 6,720 | 10,080 |
| | 100920 | $1,499 | 1 | 2 | | 1,499 | 2,998 |
| | 100582 | $980 | 5 | 12 | | 4,900 | 11,760 |
| 4574 | 100504 | $1,999 | 1 | 2 | | 1,999 | 3,998 |
| | 100896 | $1,801 | 2 | 2 | | 3,602 | 3,602 |
| 8047 | 100788 | $333 | 3 | 5 | | 999 | 1,665 |
| | 100504 | $1,999 | 4 | 8 | | 7,996 | 15,992 |
| | 100935 | $731 | 1 | 2 | | 731 | 1,462 |
| | 100896 | $1,801 | 8 | 16 | | 14,408 | 28,816 |
| | 100419 | $560 | 3 | 5 | | 1,680 | 2,800 |
| | 100920 | $1,499 | 8 | 17 | | 11,992 | 25,483 |
| | 100582 | $980 | 1 | 1 | | 980 | 980 |
| 5039 | 100788 | $333 | 10 | 23 | | 3,330 | 7,659 |
| | 100504 | $1,999 | 3 | 6 | | 5,997 | 11,994 |
| | 100935 | $731 | 5 | 5 | | 3,655 | 3,655 |
| 3110 | 100788 | $333 | 4 | 7 | | 1,332 | 2,331 |
| | 100504 | $1,999 | 2 | 5 | | 3,998 | 9,995 |
| | 100419 | $560 | 7 | 12 | | 3,920 | 6,720 |
| | 100920 | $1,499 | 4 | 7 | | 5,996 | 10,493 |
| 916 | 100504 | $1,999 | 1 | 1 | | 1,999 | 1,999 |
| | 100920 | $1,499 | 1 | 1 | | 1,499 | 1,499 |
| 3168 | 100504 | $1,999 | 1 | 2 | | 1,999 | 3,998 |
| | 100935 | $731 | 1 | 2 | | 731 | 1,462 |
| | 100896 | $1,801 | 1 | 2 | | 1,801 | 3,602 |
| | 100419 | $560 | 3 | 4 | | 1,680 | 2,240 |
| | 100920 | $1,499 | 6 | 6 | | 8,994 | 8,994 |
| 7847 | 100788 | $333 | 2 | 5 | | 666 | 1,665 |
| | 100920 | $1,499 | 2 | 5 | | 2,998 | 7,495 |
| | 100385 | $755 | 2 | 2 | | 1,510 | 1,510 |

Total for AB03  121  209  $121,342  $215,413

METHOD AND APPARATUS FOR DEALER CONNECTIVITY

FIELD OF THE INVENTION

This invention relates generally to a method, apparatus and system for automatically gathering and updating business related information; more particularly to a method and apparatus for creating a sales and inventory database for a product distribution network; and more particularly still to a method and system for automatically querying a dealer business system database to determine sales and inventory transactions, and then providing the resultant information to an upstream distributor and/or manufacturer.

BACKGROUND

Systems which provide connectivity between business entities are known. For example, many businesses utilize public telephone systems, proprietary networks, extranets, or other internet connections to exchange business information with other divisions, related companies, and third party businesses. In the case of product distribution networks, such business information is generally organized and stored in software application based databases at the various dealers. The information is useful to distributors, manufacturers and other upstream entities for planning purposes (e.g., manufacturing, shipping, and delivery schedules). Because of the wide range of business systems employed by the individual dealers, however, the systems are often not compatible either with other dealers and/or the upstream business entity. Accordingly, additional software programs, interfaces and tools are employed to overcome the discrepancies between the systems.

Figure 1A:
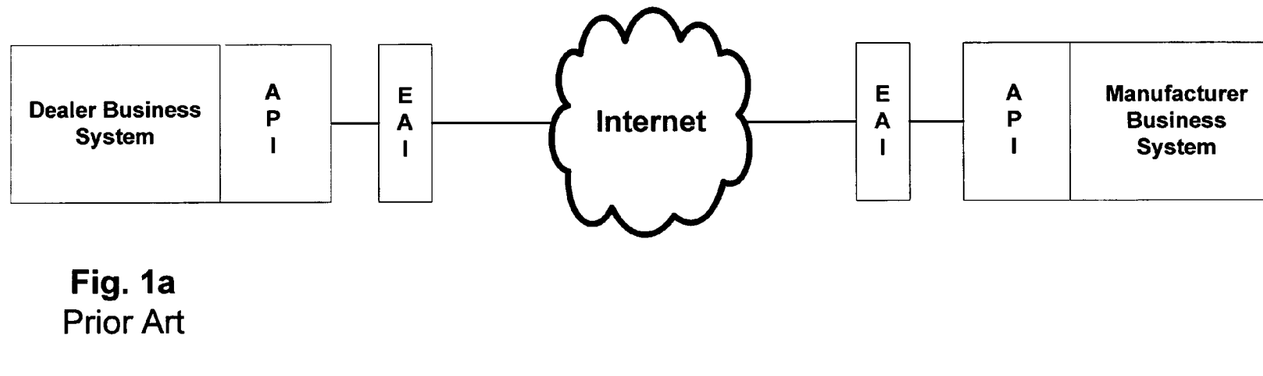
FIG. 1a schematically illustrates one prior art method of communicating dealer business system information to a manufacturer business system.

For example, oftentimes an Application Program Interface ("API") is used to transfer data between the business system data base and other software. In such systems, steps include: extracting data and mapping data to and from an API format. In these types of systems, the API hooks into the dealer business system software, and so special programming is required. In such systems, an Enterprise Application Interface ("EAI") is also utilized. The EAI translates data between the business system API and external trading partners. The steps undertaken by the EAI include transforming and mapping data between API format and an external format, as well as communicating with an external trading partner. While EAI's include generalized interface capabilities for many applications, they are provided by separate software vendors from the dealer business system software. Therefore, drawbacks of using API's and EAI's are the unique configurations and support required for each configuration. FIG. 1a illustrates one example of this type of system in the prior art.

Figure 1B:
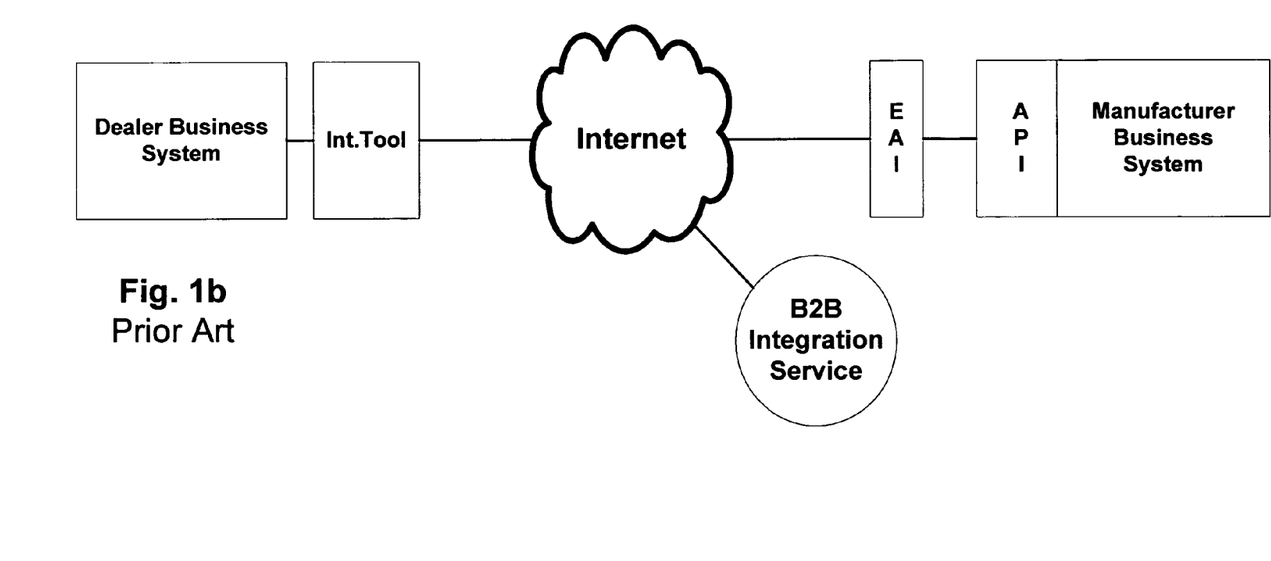
FIG. 1b schematically illustrates a second prior art method of communicating dealer business system information to a manufacturer business system using an interface tool and/or a business to business integration service.

In other systems, an Interface tool is used. This tool translates data between the business system data base and an external trading partner. Steps for this tool generally include: extracting data, mapping data to and from external formats and communicating the information with an external trading partner. The Interface tool may use an API or require changes to the business system. Drawbacks of this type of system include that the tool may have generalized features or be targeted to specific business partner relationships and specific business transactions. Further, the tool may be purchased from business system or other vendors and may be highly customized and highly integrated with the business system. FIG. 1b illustrates an example of this type of system in the prior art.

In still other systems, business-to-business ("B2B") Integration Services may be used to provide the connectivity and data transfer. In these cases, vendors may provide an external interface function that includes any-to-any translation of data format or transport protocol and other services (best seen in FIG. 1b). Drawbacks for these systems include the additional inclusion of a layer of communication and associated costs.

There are prior attempts to overcome obstacles presented by differing resources across applications, enterprises, and networks. For example, U.S. Pat. No. 7,080,092 discloses a system that generates an application view in order for a first application to access a second application without knowing functional details about the second application. U.S. Publication No. 2002/0178170 discloses a system which uses connectors that can be instantiated via downloading to provide interfaces to respective disparate database systems. U.S. Pat. No. 6,240,186 discloses a system that provides data transfers between first and second databases, across a network, in a substantially contemporaneous manner. However, these references do not overcome the issues of providing a system which is easily implemented regardless of the type of business system employed by the various dealers in a product distribution network.

Therefore, there is a need in the art for a method and apparatus which is capable of interfacing with a variety of business systems, translating the data to a format required by an upstream distribution network entity, and transmitting the data to that entity without running the business system software or modifying or enhancing the business system software. The present invention also overcomes other shortcomings of the prior art and addresses these needs in the art.

SUMMARY

A preferred embodiment of a method, apparatus and system constructed according to the principles of the present invention includes a system which may be adapted to directly access a variety of different databases utilized by different business systems. The adaptability insures that a single program may be distributed throughout a product distribution network to a variety of business system environments.

Preferably, the direct access application wakes up periodically to query the database with which it is associated. The queries are determined during a configuration phase of the direct query application, and are based on the type of system employed by the individual dealer. Preferably, the system employed by the dealer is not involved in the process (e.g., the dealer's business system does not execute instructions to successfully return the information in response to the query). Thus, specific, costly, and unique programming of the dealer business system is avoided. A scheduling module of the direct access application controls the periodic execution of the application.

In response to the query, data is then read from the dealer business computer system by a data access services module. Information relating to dealer sales and inventory (which have been retrieved from the query) are placed in a transmission queue by a queuing services module. A data mapping module retrieves data from the data queue, transforms the data into the manufacturer's standard transaction format, and presents the transformed data to a communications module. The information is then preferably transmitted via the internet to the manufacturer or other upstream distribution channel entity by the communications module. The application then goes back to sleep until the next periodic query is desired.

The information forwarded from each of the dealers is accumulated at the manufacturer's location, preferably in a database application. From the accumulated data, various reports can be run which are useful to the efficient running of the distribution channel. Since the data can be sent at virtually any time interval, the periodic reports can be scheduled to be accumulated on a basis which can provide a real time or close to real time basis. This greatly improves inventory control, vendor part shipments, manufacturing schedules, delivery schedules, etc.

Another advantage provided by preferred embodiments constructed in accordance with the principles of the present invention is that support requirements for the single system/application distributed from the manufacturer (or other upstream distribution entity) is greatly reduced. Supporting a single system creates an environment in which the burden of multiple applications and multiple configurations is eliminated. Thus, support issues can be focused on a single application with an individual who does not need extensive knowledge of each dealer's business application. Another advantage is provided by the uniform translation and communication of the data by the single system.

Therefore, according to one aspect of the invention, there is provided a system for automatically determining the retail sales and goods inventory of a manufacturer and a plurality of dealers forming a distribution network, the system comprising: a plurality of dealer business systems, each dealer business system including a processor, a database for storing information related to the retail sales of goods and the inventory at a particular dealer, the database having a predetermined format, and a memory for storing programs; a manufacturer business system including a processor, a database for storing information related to the retail sales of the goods and the inventory at the plurality of dealers, a database having a predetermined format, and memory for storing programs; a communication network operatively connected to the plurality of dealer business systems and the manufacturer business system; and a direct access program stored on each of the dealer business systems, the direct access program arranged and configured to: directly query the dealer business system database, obtain the sales and inventory data from the predetermined formats, translate the database information directly, and transmit the translated data to the manufacturer business system via the communication network.

According to another aspect of the invention, there is provided a method for automatically sending the retail sales and goods inventory of individual dealers in a distribution network to a trading partner, the method comprising: storing an application program on a business system having retail sales and goods inventory data for individual dealers thereon; extracting data directly from the business system via the application program; mapping the extracted data to an external format for communication to an external trading partner; and communicating the data to the external trading partner.

According to yet another aspect of the invention, there is provided the method of the preceding paragraph, and further including the further step of mapping the externally formatted data to a business system data format usable by the external trading partner business system computer.

An additional aspect of the invention provides a system for gathering sales and inventory information in a distribution channel for a manufacturer, comprising: means for locally and directly accessing the distribution channel business systems to obtain data on sales and inventory; means for mapping the resultant data in a single step to a transport protocol; and means for mapping the transport protocol data to a data structure usable by the manufacturer business system, wherein multiple data formats and transport protocols are avoided.

A further aspect of the invention provides a software tool for gathering sales and inventory information in a distribution channel for a manufacturer, the distribution channel comprised of a plurality of disparate business system software and computers, comprising: a generic software module loaded on each of the disparate computers, the software module being arranged and configured to directly access the sales and inventory database residing on the computer system and minimize utilization of the business system software, whereby specific programming for the generic software module is eliminated; a mapping module, the mapping module arranged and configured to convert the sales and inventory data into a transport protocol; and a communication module for forwarding the converted data to the manufacturer; and a data queuing module for persistence of data to ensure delivery to the manufacturer in the event of network or system outages.

While the invention will be described with respect to preferred embodiment configurations and with respect to particular modules used therein, it will be understood that the invention is not to be construed as limited in any manner by either such configuration or modules described herein. Instead, the principles of this invention extend to any application which is programmed to directly query/access a variety of business application systems and communicate the results to an upstream entity in the distribution channel, where the resulting information is used to describe the inventory and/or sales status of the distribution network. While in the preferred embodiment the queried information is sales and inventory data, other data may be gathered. For example, the data may be other information used in conducting business in the distribution network such as ordering, shipping, warranty information, etc. While preferred programming steps and logical flow will be described herein in connection with a manufacturer for convenience, it will be understood that the scope of the invention is not to be so limited. The invention may be employed in other environments in which the information is directed to a distributor, final assembly, franchisor, master franchisee, or other upstream entity in a distribution channel. These and other variations of the invention will become apparent to those skilled in the art upon a more detailed description of the invention.

The advantages and features which characterize the invention are pointed out with particularity in the claims annexed hereto and forming a part hereof. For a better understanding of the invention, however, reference should be had to the drawings which form a part hereof and to the accompanying descriptive matter, in which there is illustrated and described a preferred embodiment of the invention.

BRIEF DESCRIPTION OF THE DRAWINGS

Referring to the drawings, wherein like numerals represent like parts throughout the several views.

DETAILED DESCRIPTION

The principles of the present invention apply particularly well to its application in a manufacturer and dealer product distribution network. However, other product and service distribution environments may also employ the principles of this invention. For example, the present invention may be employed in a setting where a distributor is the upstream product distribution entity.

Figure 2:
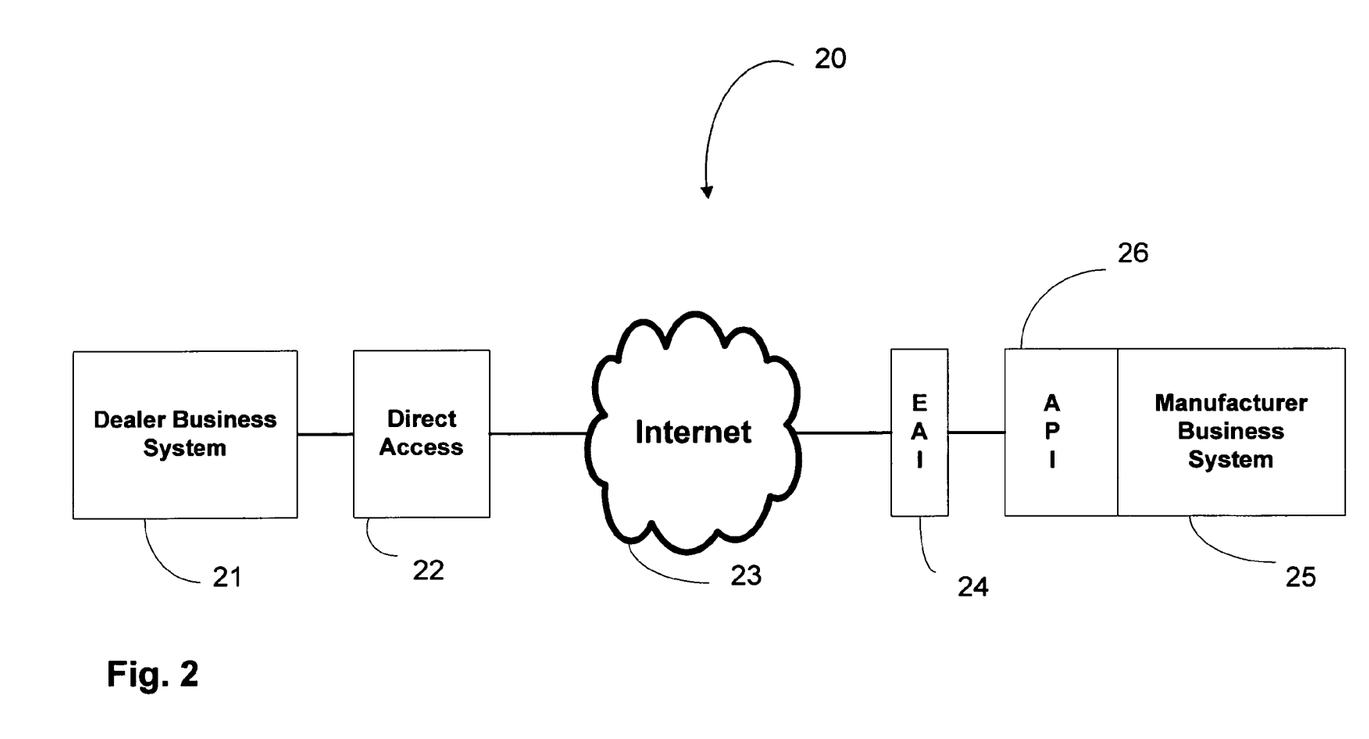
FIG. 2 illustrates schematically a preferred embodiment constructed in accordance with the principles of the present invention in which a direct access application is employed on a dealer network to directly access and query the dealer business system database and communicates the resulting information to a manufacturer business system.

Referring first to FIG. 2, there is shown a schematic view of an environment 20 in which the present invention may be employed. In the representative environment, the dealer business system 21 is connected to the direct access application 22 which will be described in more detail further below. The software may be connected via the internet 23 to the manufacturer business system 25 via an API 26 and EAI 24. It will be appreciated, however, that the connection may be a proprietary network, direct line, wireless communication, or other public telephone network system. The direct access application 22 takes the place of any type of business to business integration service, interface tool, EAI, and/or API employed at the dealer business system 21. Accordingly, by eliminating these modules and systems, the distribution, deployment, configuration, and support of the system is greatly simplified due to the standardization and flexibility of the direct access application 22.

It will be appreciated that if a particular dealer business system includes a business to business integration service, interface tool, EAI, and/or API that could be used without customization, then such a system may be employed to access the data versus the present invention's more direct approach for that particular dealer—depending on ease of implementation and expected reliability, etc. However, across an entire distribution network the present invention provides a system, apparatus and method which can be deployed across the entire network in a manner where only a single module needs to be adjusted for the specific or particular dealer business system.

Figure 3:
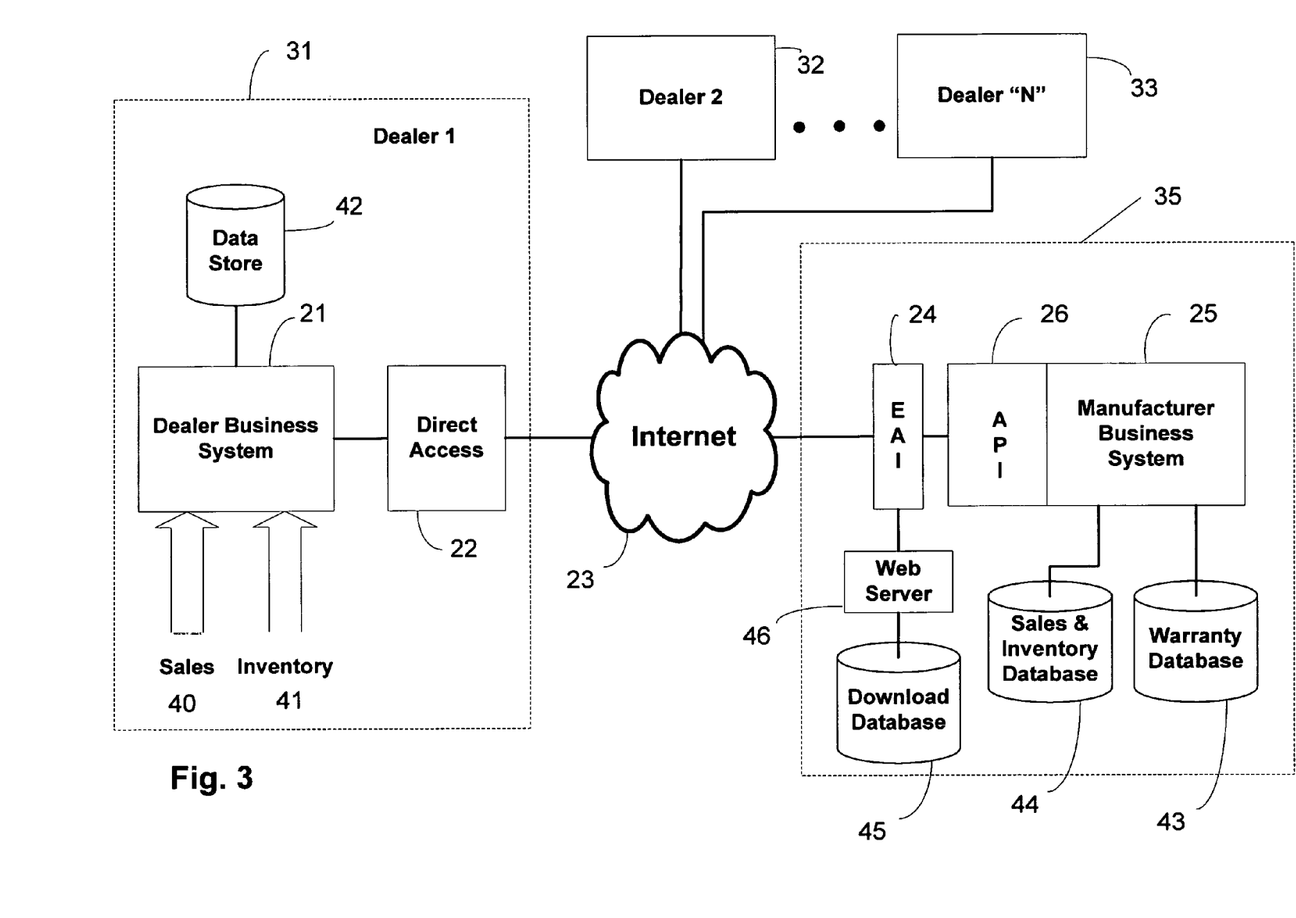
FIG. 3 is a schematic illustration of the system in FIG. 2 showing a plurality of dealers, the inputs into the dealer business system, and the manufacturer databases.

Turning to FIG. 3, there is shown a plurality of dealers with dealer computer systems in blocks 31, 32, and 33, representing dealer 1, dealer 2, and up through dealer "N" (e.g., a plurality of dealers, where N preferably equals the number of dealers in the distribution network). It will be appreciated, that if each dealer is included in the reporting system, then the results being reported back to the manufacturer business system 25 will be the most accurate. In this way, a virtual sales and inventory view of the entire dealer distribution network can be determined. However, N may be comprised of a lesser number of dealers that are willing to participate and/or share their sales and inventory data. In that case, the present system still provides advantages and utility.

The term "virtual" as used in connection with the distribution network's sales and inventory is not meant to imply that the sales and inventory database is not actually constructed and/or that reports are not run. Instead, the term is used to describe that the inventory is in reality, physically dispersed throughout the distribution network at a plurality of locations. Further, the sales are made by a number of different entities. Therefore, the sales and inventory view of the entire distribution network is virtual in that it is not owned or controlled by a single entity.

Also shown in FIG. 3 is the input of dealer sales information designated at 40 and the input of dealer inventory information designated at 41. These pieces of information are input into the dealer business system 21 in the usual and customary manner. The direct access application 22 does not require a change to the manner in which this information is input into the dealer business system 21. Further, none of the use made by the dealer of the dealer business system 21 is affected by the direct access application 22. The sales information 40 and the inventory information 41 is processed and subsequently stored on the datastore 42. As will be described in more detail below, the direct access application 22 is arranged and configured to directly access the data in the datastore 42 so that the dealer business system 21 does not need to be programmed or otherwise run during the process of obtaining the necessary data from the datastore 42. The information provided to the manufacturer business system 25 may be put into sales and inventory database 44 and warranty database 43. Such databases may have reports run on them as described below in order to provide forecasts, inventory, manufacturing, delivery, and other scheduling data so as to make the distribution network run more efficiently. For the direct access application 22 to be installed on the dealer computer system 31, the application may be originally stored in a download database 45 in the manufacturer's computer system 35. The software may be delivered to the dealer computer system 31 by downloading it over the internet 23 in an industry common way. Preferably, pre-configured direct access software 22 ready for installation is stored in download database 45 and obtained via web server 46. It will be appreciated, however, that other forms of downloading and installing the application may be utilized. For example, the application may be stored on a CD, DVD or other means to directly load the software at the dealer computer system 31. The present preferred embodiment illustrated in FIG. 3 being one of distribution of the software program over the internet 23.

It will also be appreciated that while not specifically shown, the dealer computer system 31 includes one or more processors, random access memory, hard disks and other memory storage devices, communication devices, and peripheral input and output devices, as well as other necessary and/or desirable devices that enable the dealer computer system 31 to operate in its intended manner.

Figures 4, 5:
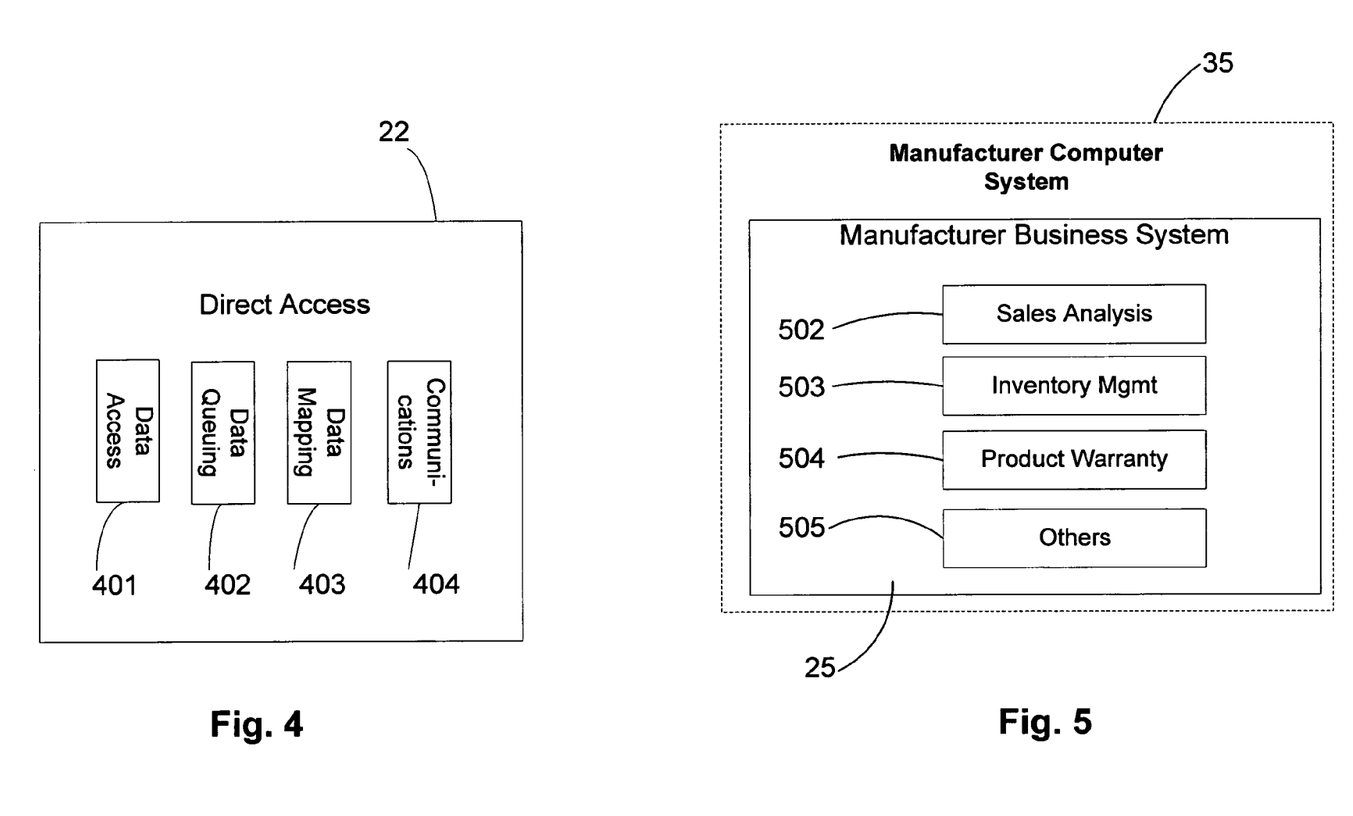
FIG. 4 is a functional block diagram illustrating the different modules included in the direct access application.
FIG. 5 is a functional block diagram illustrating the different back-end modules included in a typical manufacturer business computer system.

Referring now to FIG. 3 and FIG. 4, the different modules of the direct access application 22 will be described. Datastore 42 comprises a database and/or file structure that is connected to and/or provided within the dealer business system in which the dealer sales data 40 and inventory data 41 is stored. A datastore interface (not shown) is connected to the datastore 42. The interface component may be provided with the dealer business software package. The interface component receives data requests from the data access module 401 of the direct access application 22. It extracts the data from the datastore 42, and returns the requested data to the data access module 401. It may be a data interface tool, application program interface, or database driver.

The modules of the direct access application 22 include a data access module 401, a data queuing module 402, a data mapping module 403, and a communication module 404. The data access module 401 is a component provided with the direct access application 22 that presents the data request to the datastore 42 or datastore interface in a form understood by the respective component. The data access module 401 receives back the requested data and forwards the data to the data queuing module 402. The data access module 401 is preferably a single plug-in component that is programmed to implement a datastore connection strategy unique for each unique dealer business software system 21. It may include a database driver, a custom database driver, or a custom interface.

Data queuing module 402 receives data from the data access module 401, and maintains a queue of data for the data mapping module 403. Data mapping module 403 retrieves data from the data queue, transforms it into manufacturer standard format, and presents the transformed data to the communications module 404. After the communications module 404 receives the data in the manufacturer's standard format from the data mapping module 403, it transmits the data to the manufacturer computer system 35 via internet connection 23. It also removes data from the queue that is successfully transmitted to the manufacturer computer system 35.

Referring now to FIG. 3 and FIG. 5, several of the backend components of the manufacturer computer system 35 will be described in more detail. A communications module (not shown) receives data in the standard format from the direct access application 22 via internet connection 23. It then presents the data to a data forwarder module (not shown). The data forwarder module receives data from the communications module, transforms it into various formats required by backend applications 502-505, and then transfers the data to the various manufacturer databases (e.g. 43 and 44) for use by backend applications 502-505.

Illustrated in FIG. 5 as backend applications within manufacturer business system 25 are sales analysis module 502, inventory management module 503, product warranty module 504 and a block labeled others 505. Each of these modules receives data in the required format from the data forwarder module and processes the sales and inventory data as needed for each application. It will be appreciated that other types of applications other than those set forth in modules 502, 503 and 504 may be included. Accordingly, block 505 labeled others is intended to illustrate that other types and styles of applications may be included at the manufacturer business system to utilize the received sales and inventory data.

Figure 6:
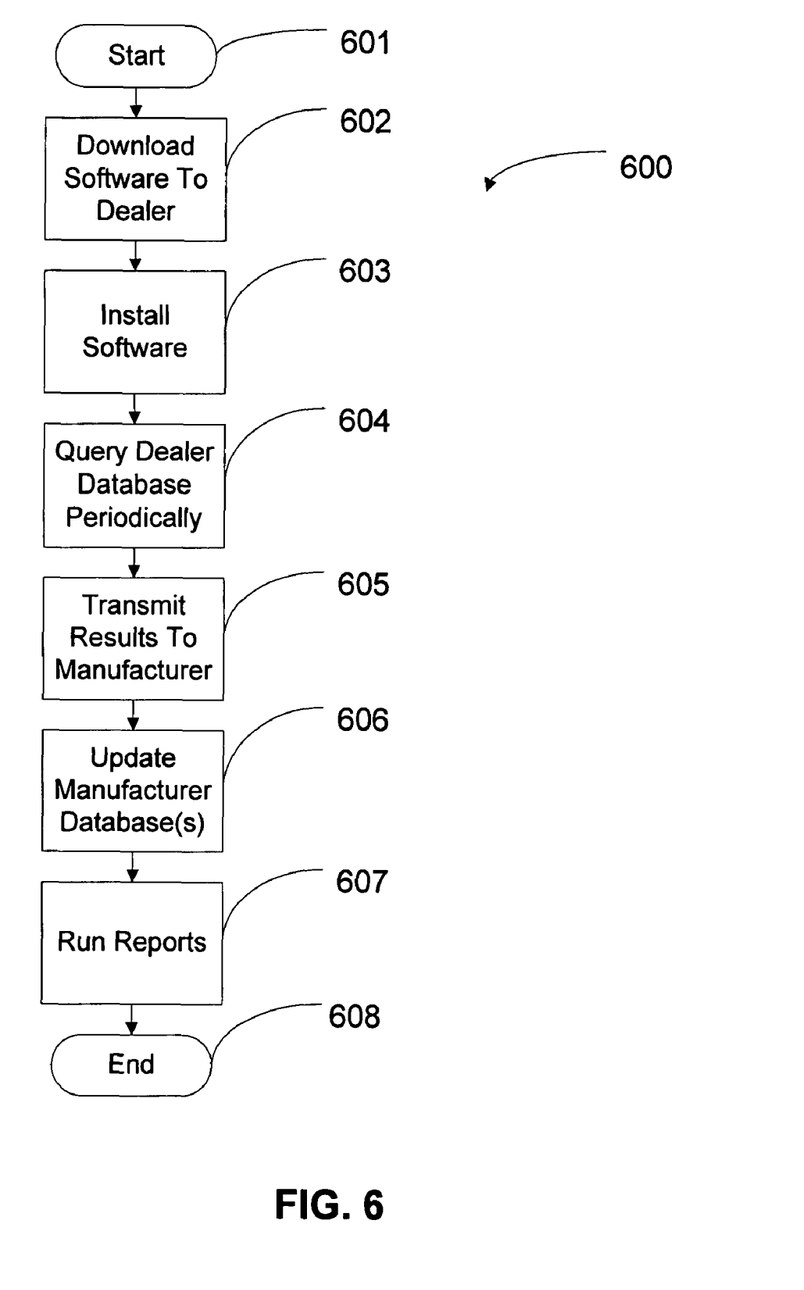
FIG. 6 is a logic flow diagram of the steps which may be employed to implement a preferred embodiment of the invention construction according to the principles of the present invention.

FIG. 6 provides a schematic logical flow of the steps which may be taken to install and run the direct access application 22, transmit results to the manufacturer, and then create a report (i.e., the manufacturer creates the report from the reported results). The steps are shown generally at 600 and the process starts at step 601. Proceeding to step 602, the application is preferably downloaded to the dealer computer system 31. A version of the direct access software 22 is selected for download that is preconfigured for the specific dealer business software package used by the dealer. The download occurs via the internet 23 via web server 46 and download database 45. Next at step 603 the application is installed on the dealer computer system 31. Generally, the application will be installed on a server or other computer device in a manner where it is able to access the datastore 42 and make a connection to the internet 23 as described above. The software is installed in a known manner.

After installation at step 604, the software is programmed to periodically query the data in the datastore 42. Preferably the dealer database is queried to determine the sales 40 and inventory 41 information as it is input into the dealer business system 21. The query may be programmed to return only information which has been input since the last query. However, it will be appreciated that sales and inventory information for longer periods of time may be reviewed and transmitted to the manufacturer business system 25 (i.e., at which time the relevant data is determined). To conserve computer resources, however, it is preferred to only query and transmit the recent sales and inventory data as is it comprises a smaller amount of information and is more efficient.

The information resulting from the query is then transmitted to the manufacturer at block 605. Preferably, the information is sent via a secure internet connection 23.

Figure 9:
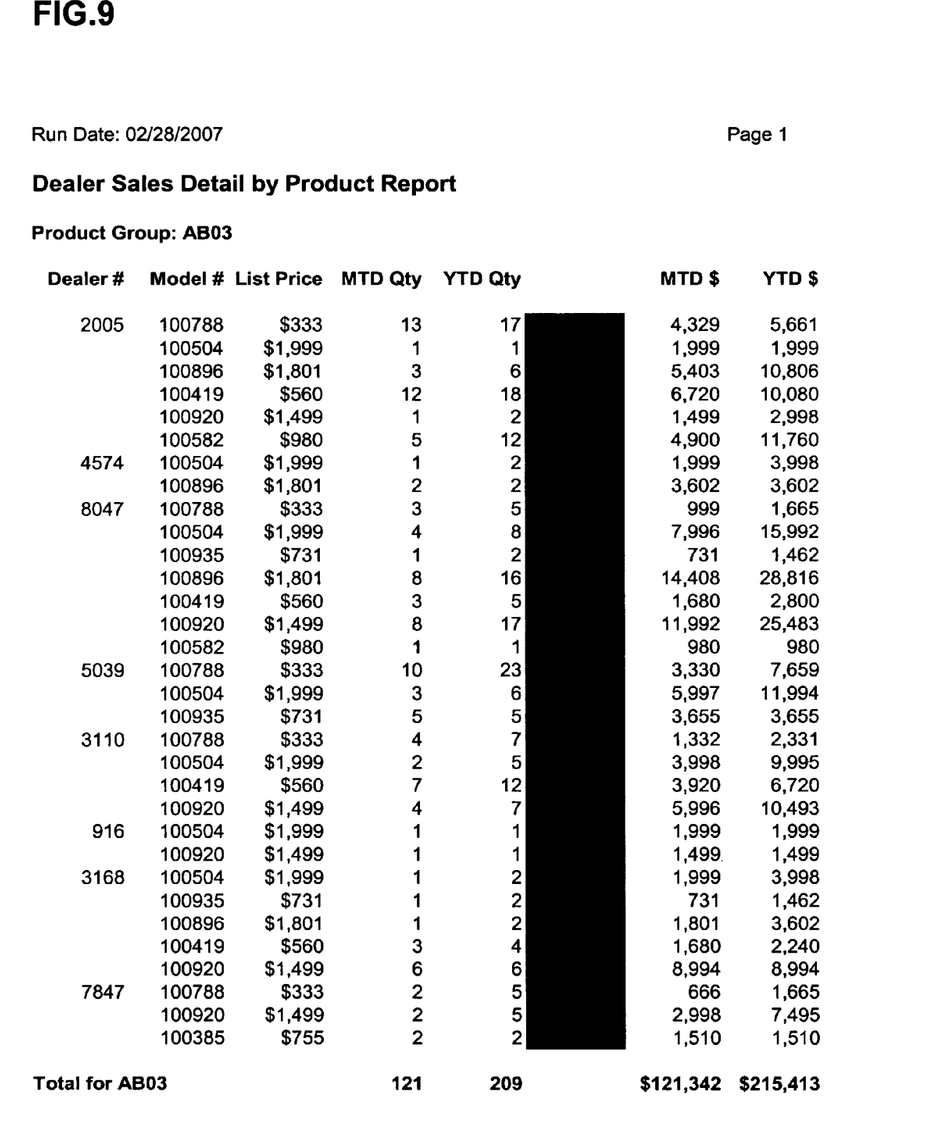
FIG. 9 is a hypothetical report created from the manufacturer database.

At block 606 the manufacturer databases (e.g., sales and inventory database 44 and warranty database 43) are then updated with dealer data. The collective information from all reporting dealer computer systems 31-33 provides information on the entire sales and inventory in the dealer distribution network. This accords the manufacturer with a sales and inventory reporting structure of the entire dealer distribution network in what may be close to real time. This information is important to the manufacturer since it can improve manufacturing schedules, delivery schedules, and the like. Reports may be run for internal use by the manufacturer at block 607. An example of a report which may be created is illustrated in FIG. 9 at 900. In FIG. 9, sales are broken down by dealer and then products by dealer. Other reports or portions thereof may also be distributed to the dealer at block 607. The process then ends at step 608.

Figure 7:
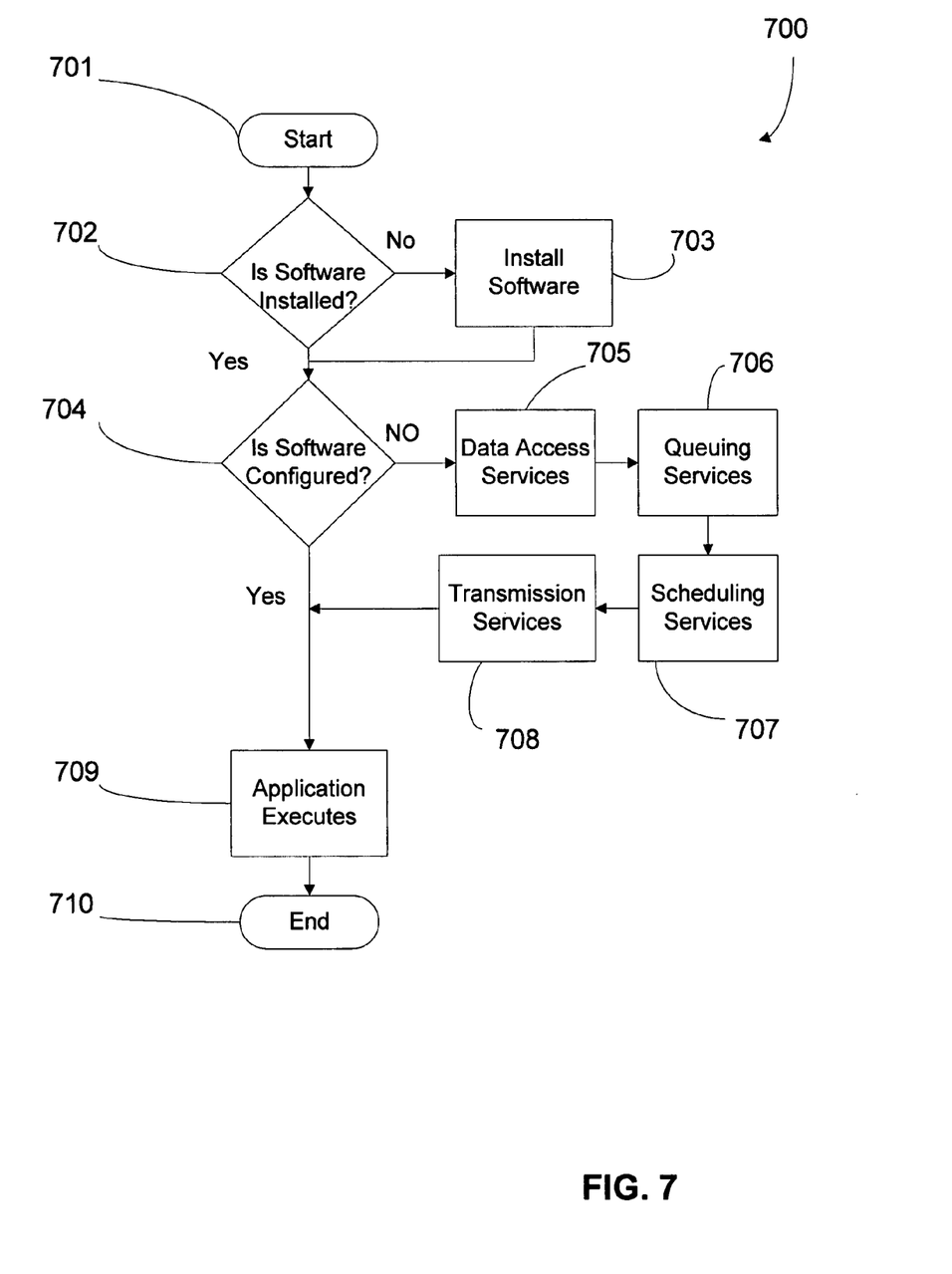
FIG. 7 is a logic flow diagram of the steps which may be employed to install and configure the direct access application.

Now referring to FIG. 7, there is illustrated an alternative to the preferred embodiment, wherein a common direct access program is provided to the dealer computer system 31 and the application is configured on-site. The process is shown generally at 700 and starts at block 701. Proceeding to block 702, a determination is made whether the software has been installed. If it has been installed, the process moves to block 704 to determine if the software is configured. However, if the software has not been installed, then the process moves to install the software at block 703. This process is described above in connection with FIG. 6 at blocks 602 and 603.

Proceeding to block 704, if the software has been configured, then the application may execute at block 709. However, the process may also inquire whether changes should be made based on changes to the dealer business system 21 or other changes related to scheduling, transmission paths, etc. Configuring the software is preferably performed via a separate configuration screen with pull down menus for the various menus and fields for any necessary queries, addresses, network drives, and/or domains. Escape sequences and other interrupt driven processes may also be used. If the software has not been configured, then the process proceeds to blocks 705, 706, 707 and 708. While these blocks are shown in sequence in FIG. 7, it will be appreciated that any order of configuring these modules of the software may be utilized. Further, the functions that are described in connection with the modules 401-404 are the same regardless of whether the software is configured at the manufacturer's site or dealer's site.

Generally, the software configuration will be provided with a user interface by which the administrator can configure the type of internet connection, scheduling of information transfer, type of sales system to pull data from, and credentials for accessing the sales system. At block 705 for the data access services, this module provides a common interface for pulling data from the different dealer business systems with which the direct access software 22 is utilized.

A generic example of developing a data access service for integrating via SQL with a back end database for a dealer business system 21 is set forth in Table I. The SQL has been simplified to show basic query requirements key tables, but without all the data elements.

TABLE I

1) Obtain a driver for connecting to the database.
2) Secure database access via anonymous access or a dealer entered user ID and password.
3) Analyze the database and locate the requisite data.
4) Construct SQL queries to extract the data.
5) Create extractor to convert query results into standard internal format.
Example Inventory Query (Simplified)
　　select partnumber, description
　　　　from partinventory, partslist
　　　　where partinventory.partnumber=partslist.partnumber
　　　　　　and prefix in {insert manufacturer codes here}
Example Invoice Query (Simplified)
　　select invoice."invoice number", status, date
　　　　from invoice, invoicebill
　　　　where invoice."invoice number" = invoicebill."invoice number"
　　　　　　and prefix in {insert manufacturer codes here}

The direct access application 22 is adaptable to work with multiple dealer business software packages. Accommodating various software packages is simplified by the isolating the differences among packages into a single component, data access module 401. The main functions of data access 401 are to retrieve data from the datastore 42 via the datastore interface and to deliver the data to data queuing module 402 in a standard internal format.

Data access module 401 is a unique component developed for each dealer business software package and varies in design based on software package's unique architecture, including datastore structure, database drivers, API's, and others. The preferred design is to retrieve data using SQL to access the underlying database via a database driver. The driver may be included with the software package or obtained from a database vendor and included with the data access component.

It will be appreciated that changes to the underlying data access component may be made in a number of ways including via programming, queries, lists, and/or screens. The description provided above regarding the data access module 401 may also be utilized when specific software is created at the manufacturer site for download to specific dealers.

The queuing services module 706 provides the methodology by which data is obtained and pushed to a transmission queue which is regulated by the communications module 404. At block 707 the scheduling services are configured. This module handles the sleeping and waking up to query the data on a regular basis. It coordinates the work and sends data via the transmission services. Additionally, this module 707, can retrieve software updates from the manufacturer business system through the transmission services and schedule installation of the software. This may be accomplished at block 704 where not only is the software configuration determined, but also whether there are updates which should be installed. At block 708 the communications module 404 is configured. This module handles the network monitoring and transmission of queued data. The module preferably understands the difference between dial-up and continuous connections and plans data sends accordingly. The module sends data in a compact format to minimize network bandwidth usage, and loads updates and scheduling modifications from the manufacturer computer system 35. Once the software is configured (e.g., and/or there are no updates to install) then the process moves to block 709 where the applications is free to execute according to the schedule determined with scheduling service module 707. The process ends at block 710.

Figure 8:
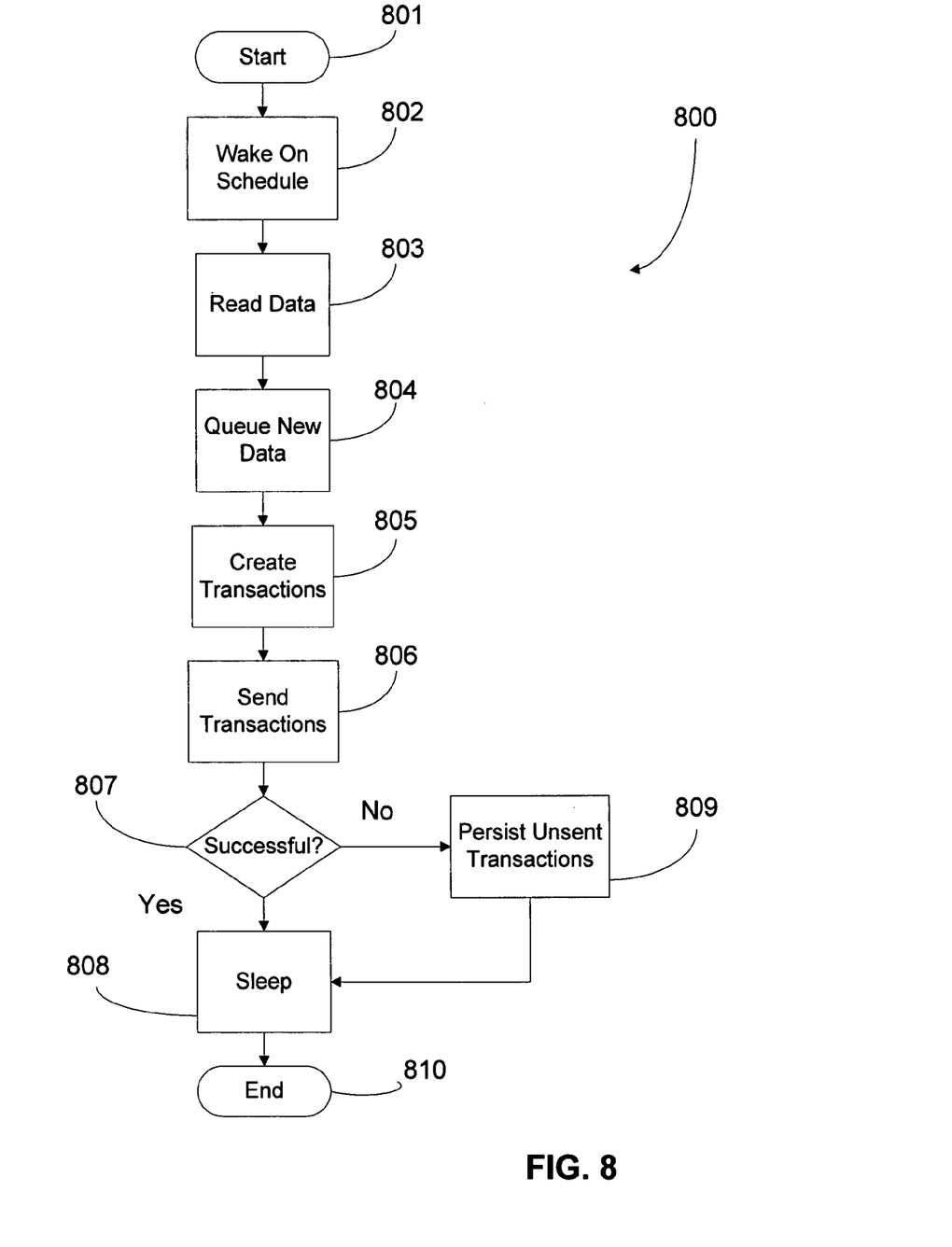
FIG. 8 is a logic flow diagram of the steps which may be employed for the direct access application to query the dealer business system's database, translate the data, and communicate the data to the upstream distribution network entity.

FIG. 8 illustrates the logical flow taken by the direct access software 22 during the process that presents a cycle of querying the dealer business computer system 21 and the associated datastore 42. This process is shown generally at 800 and begins at block 801. Proceeding to block 802, the software "wakes up" on the schedule determined by the scheduling services module (described in block 707 above). At block 803 the data is then read from the dealer business computer system 21 by the data access services module 401. The data includes the sales data since the last cycle and current inventory balances. At block 804, the new data relating to the sales and inventory, which have been retrieved from the query, are placed in a queue by the data queuing module 402. At block 805, the data is mapped and transactions are created in a format ready for transmission by data mapping module 403. At block 806 the items are sent preferably via the internet by the communications module 404. Preferably, the receipt of the data is confirmed from the manufacturer business system 25 and various types of error checking systems may be employed to ensure that the data was received successfully and correctly at that end. If the data was not correctly received, then a resend/retransmit process may be invoked. At block 807 if transmission is not successful, then at block 809 the transactions are added back to the queue for the next cycle.

Proceeding to block 808, the system goes back to sleep and the cycle ends at block 810.

Other features and aspects of preferred embodiments in accordance with the present invention include allowing automatic updates to the direct access software 22 at the dealer and automatic changes to properties (parameters) that are used by the software at the dealer. Such properties may include time to wake up, URL to send to, last-read-date, and others to help the manufacturer monitor or repair without dealer involvement. Also the direct access software 22 can sends logs to the manufacturer for monitoring and problem solving.

It will be appreciated that the principles of this invention apply to a method, apparatus and system of collecting information from a disparate group of systems employed by a plurality of dealers in a distribution network. While particular embodiments of the invention have been described with respect to its application, it will be understood by those skilled in the art that the invention is not limited by such application or embodiment or the particular components disclosed and described herein. It will be appreciated by those skilled in the art that other components and modules that embody the principles of this invention and other applications therefor other than as described herein can be configured within the spirit and intent of this invention. The arrangement described herein is provided as only one example of an embodiment that incorporates and practices the principles of this invention. For example, the data flow may be bi-directional between the dealers and the up-stream distribution network. Other modifications and alterations are well within the knowledge of those skilled in the art and are to be included within the broad scope of the appended claims.

What is claimed is:

1. A system for automatically determining the retail sales and goods inventory of a manufacturer and a plurality of dealers forming a distribution network, the system comprising:
   a plurality of dealer business systems, wherein at least one of the plurality of dealer business systems differs from the other dealer business systems, each dealer business system including a processor, a database for storing information related to the retail sales of goods and the inventory at a particular dealer, the database having a first predetermined data format, and a memory for storing programs;
   a manufacturer business system including a processor, a database for storing information related to the retail sales of the goods and the inventory at the plurality of dealers, a database having a second predetermined data format, and memory for storing programs;
   a communication network operatively connected to the plurality of dealer business systems and the manufacturer business system; and
   a direct access program stored on each of the dealer business systems, the direct access program arranged and configured to:
      directly query and obtain database information from the corresponding dealer business system database independent of a program associated with the corresponding dealer business system, and wherein the database information is obtained without the operation of the program associated with the corresponding dealer business system,
      translate the database information directly from the first predetermined data format to an intermediate standard data format of the manufacturer business system, and
      transmit the database information to the manufacturer business system via the communication network, wherein the database information is further translated to the second predetermined data format for storage in the database of the manufacturer business system.

2. The system of claim 1, wherein the communication network is the internet.

3. The system of claim 1, wherein the translated data is stored on the manufacturer business system database in the second predetermined data format.

4. The system of claim 3, further comprising a report writer program stored in the manufacturer business system memory, the report writer arranged and configured to generate reports from the stored translated data.

5. A method for automatically sending the retail sales and goods inventory of individual dealers in a distribution network to an external upstream trading partner, wherein at least one of the individual dealers in the distribution network uses a different business system than the other individual dealers, the method comprising:
   a) storing a direct access application program on a business computer system including a processor and a database storing retail sales and goods inventory data for individual dealers thereon;
   b) querying and obtaining data directly from the database of the business computer system via the direct access application program independent of a program associated with the business computer system, and wherein the data is retrieved without the operation of the program associated with business computer system;
   c) mapping the retrieved data from a first data format of the business computer system to an intermediate standard data format of an external trading partner computer system for communication to the external upstream trading partner computer system; and
   d) communicating the data to the external upstream trading partner computer system for subsequent mapping of the data from the intermediate standard data format to a second data format for storage in a database of the external upstream trading partner computer system.

6. The method of claim 5, further comprising generating one or more reports from the communicated data by the external trading partner computer system.

7. The method of claim 5, further comprising repeating steps a-e periodically.

8. The method of claim 5, further comprising repeating steps a-e when the sales and goods inventory data changes.

9. A system for gathering sales and inventory information in a distribution channel for a manufacturer, comprising:
   direct access means for locally and directly accessing a database of a distribution channel business system to directly query and obtain data on sales and inventory from the database of the business system including a processor, independent of a program associated with the business system and without the operation of the program associated with the business system;
   means for mapping the resultant data in a single step to a transport protocol; and
   means for mapping the transport protocol data to a data structure usable by a manufacturer business system, wherein multiple data formats and transport protocols are avoided.

10. The system of claim 9, wherein the means for locally and directly accessing is a data access module arranged and configured specifically for a specific system.

11. The system of claim 10, wherein the means for mapping the resultant data and the means for mapping the transport protocol are common modules which may be provided to a plurality of specific systems without modification.

12. The system of claim 10, wherein the data access module includes a datastore query which may be changed in order to directly access specific datastores.

13. The system of claim 11, wherein the data access module includes a datastore query which may be changed in order to directly access specific datastores.

14. An article of manufacture including a non-transitory computer readable media having computer instructions stored thereon, the computer instructions implementing a software tool for gathering sales and inventory information in a distribution channel for a manufacturer, the distribution channel comprised of a plurality of disparate business system software and computers, comprising:
   a generic direct access software module arranged and configured to be loaded on each of the disparate computers, the direct access software module being further arranged and configured to directly access the sales and inventory database residing on the computer system to query and obtain database information from the inventory database independent of the business system software, and wherein the database information is obtained without the operation of the program associated with the business system software, whereby specific programming for the generic software module is eliminated;
   a mapping module, the mapping module arranged and configured to convert the sales and inventory data from a first predetermined data format of the computer system to an intermediate standard data format of a manufacturer computer system;

a transport module for forwarding the converted data to the manufacturer computer system for further translation to a second predetermined data format for storage in a database of the manufacturer computer system; and a data queuing module for persistence of data to ensure guaranteed delivery to the manufacturer in the event of network or system outages.

* * * * *

UNITED STATES PATENT AND TRADEMARK OFFICE
CERTIFICATE OF CORRECTION

PATENT NO. : 8,239,292 B2
APPLICATION NO. : 11/827191
DATED : August 7, 2012
INVENTOR(S) : Drazan et al.

Page 1 of 1

It is certified that error appears in the above-identified patent and that said Letters Patent is hereby corrected as shown below:

In the Claims

Col. 11, line 67, claim 5: "with business computer system;" should read --with the business computer system;--

Signed and Sealed this
Third Day of December, 2013

Margaret A. Focarino
*Commissioner for Patents of the United States Patent and Trademark Office*